Jan. 23, 1968  L. W. HETTICH  3,365,252

BEARING ASSEMBLY PRELOAD APPARATUS

Filed Aug. 16, 1965  2 Sheets-Sheet 1

Leopold W. Hettich,
INVENTOR.

BY,

Golove & Kleinberg

ATTORNEY.

Jan. 23, 1968

L. W. HETTICH 3,365,252

BEARING ASSEMBLY PRELOAD APPARATUS

Filed Aug. 16, 1965.

Leopold W. Hettich,
INVENTOR.

BY.

Golove & Kleinberg

ATTORNEY.

United States Patent Office 3,365,252
Patented Jan. 23, 1968

3,365,252
BEARING ASSEMBLY PRELOAD APPARATUS
Leopold W. Hettich, Monrovia, Calif., assignor to Hycon Manufacturing Co., Monrovia, Calif.
Filed Aug. 16, 1965, Ser. No. 479,768
13 Claims. (Cl. 308—189)

ABSTRACT OF THE DISCLOSURE

Apparatus utilizing pressure differentials to apply a preloading force to a bearing assembly. An elastic member supports the bearing which is mounted on a rotatable shaft and a pressure differential is created on opposite sides of the elastic member.

---

This invention relates to preloaded bearing assemblies and, more particularly, to assemblies for pneumatically preloading ball or roller shaft bearings and for selectively centering rotating shafts associated therewith.

Uncontrolled end whip of a rotating shaft is one of the most important causes of rapid, destructive, bearing wear. Radial vibratory motions at any shaft position have, in general, a like effect. Such shaft motions also limit the precision attainable in rotating machinery. As adverse as such effect may appear, however, it is undesirable to eliminate all shaft movements other than rotation, for to do so would allow the direct transmission of shocks through bearings to the shafts supported by those bearings. Moreover, such movements are often required in the operation of the particular machinery.

In view of these problems, various techniques have been devised for preloading, that is, placing a yielding pressure in the static condition on, ball and roller bearings supporting rotating shafts. In general, spring preloading assemblies have been used to support rotating shafts with some resiliency in order to reduce and control shaft end whip and other vibrations and to render more precise and tolerances of the bearings. Such arrangements have proved helpful in reducing bearing wear and prolonging the life of devices including such arrangements.

However, spring preloading arrangements have not proved entirely satisfactory. For example, because of their fixed positions some spring preloading assemblies are incapable of operating in devices where shaft length may vary. Other spring preloading assemblies, though capable of operating with varying shaft lengths are not feasibly used with shafts the lengths of which vary substantially. In general, spring-applied pressures remain relatively constant for very small movements, only. Thus, many preloaded assemblies are affected by thermal expansion of the shaft in a manner such that the preloading is substantially and detrimentally reduced or increased.

Many types of spring loading techniques require that a small, yet dangerously-wearing amount of free play be provided for bearing surfaces in order to allow proper shaft rotation. No known arrangement which utilizes spring loading provides exactly uniform pressures over the entire loaded surface of the bearing. Furthermore, none of the known arrangements provide anything like uniform pressure once any degree of wear has taken place. The lack of uniform pressure over all of the bearing surfaces can only enhance bearing wear.

Other problems also arise with spring loaded bearing assemblies. For example, most such assemblies have no provision for varying the degree of centering provided to allow utilization in a number of differing situations. The particular built-in resiliency of the particular spring, in general, allows the only variation in centering. For these and other reasons, a new approach to the problem of preloading and centering shaft bearings is desirable.

According to the present invention, there is provided a unique bearing assembly which utilizes a pressure differential, the force coming from an intentionally introduced pressure differential on opposite sides of a fluid tight elastic member to apply a uniform pressure to a surface. The term "elastic" is intended to cover any member, whether metallic or not, capable of volumetric expansion and contraction. More particularly, in one embodiment an elastically-maintained, cup-like bearing support is provided to hold a set of shaft bearings in a particular position. The cup forms a portion of the wall of a fluid tight container which may be evacuated or pressurized, depending on the particular construction, in order to provide a force for maintaining a preloading pressure upon the bearings of the shaft. By the use of a controlled fluid preloading arrangement, a uniform pressure is applied over the whole preloaded surface of the bearings.

Should wear occur, the pressure over the bearing surface tends to remain uniform and substantially constant. Moreover, the shape of the elastic material joining the cup-like portion to the remainder of the container allows a preselected degree of shaft centering to be attained. The use of the elastic interconnecting portion prevents shaft lengthening or contracting due to thermal expansion or to actual movement of the shaft from having any effect on the pressure applied to preload the bearings or on the uniformity of application of that pressure.

Although preferred embodiments are described utilizing a vacuum-atmospheric pressure differential, the differential can be provided by gases under relatively high pressures or other fluids under pressure. The term "fluid" is used generically, to include liquids and gases.

It is therefore the primary object of this invention to provide an improved preloaded shaft bearing assembly.

Another object of this invention is to provide a shaft bearing assembly which provides uniform preloading pressure over all loaded surfaces.

An additional object of this invention is to provide a preloaded bearing assembly which maintains uniform pressures even after wear.

Another object of this invention is to provide a unique self-centering assembly for maintaining shaft bearings at particular preselected positions.

It is another object of this invention to provide a preloaded bearing assembly which may be used for both end and middle of shaft bearings.

A further object of this invention is to provide a shaft bearing preloading assembly which may be used with either ball or roller bearings.

Another object of this invention is to provide a shaft bearing preloading assembly which damps shaft whip without eliminating shaft movement entirely so that weakening shocks are not relayed through the bearing to damage the shaft.

Another object of this invention is to provide a unique arrangement for placing an axial pressure on a shaft.

Yet another object of this invention is to provide a bearing assembly which allows substantial choice in the degree of centering provided.

These and other novel features characteristic of the invention, both as to its organization and to its method of operation, together with further objects, features and advantages thereof will be better understood from the following description considered in connection with the accompanying drawings in which several embodiments of the invention are illustrated by way of example. It is to be expressly understood that the drawings are for the purpose of illustration and description only and are not intended as a definition of the limits of the invention.

With reference to the drawings, it should be initially noted that substantially identical elements of the various figures carry identical designations.

Figure 1:
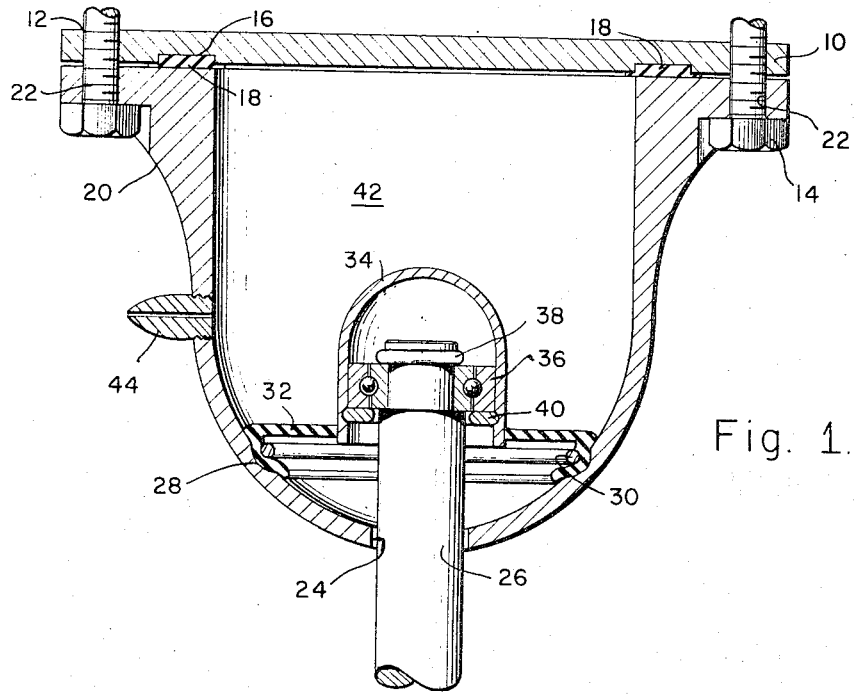
FIGURE 1 is a cross-sectional view of a pneumatic bearing assembly in accordance with the invention utilizing an elastic member having a diaphragmatic shape.

In FIGURE 1 is illustrated a first embodiment of the invention. The device there shown includes a base plate 10 of a rigid material, such as a metal, having characteristics such as to allow it to be affixed to a machine body. The base plate 10 may be generally circular and of a relatively uniform thickness. The plate 10 shown has a pair of holes 12 for bolts 14 or other well known means for securing it to a machine body, not shown. A greater number of holes 12 may obviously be provided if warranted by the circumstances. The plate 10 also has a shallow circular groove 16 of uniform depth in its lower surface. The groove 16 is adapted to receive a strip of resilient material 18 (e.g., rubber or a soft plastic) for forming a pressure seal when the plate 10 is drawn tightly against a rigid body 20. For this purpose, the material 18 filling the groove 16 may be caused to extend slightly therefrom in the unstressed condition.

The body 20 may be formed from a high strength rigid material, such as a plastic or a metal, capable of withstanding the shocks normal to the particular machinery with which the assembly is to be associated. The body 20 in the particular embodiment shown has the general form of an inverted bell with a pair of holes 22 (matching the holes 12 of the plate 10) provided for mounting to the plate 10. An axial hole 24 is also provided at the lower end of the body 20 through which a shaft 26 extends. The upper surface of the body 20 which mates with the plate 10 is preferably machined or otherwise formed (as is the plate 10) to provide a precise match with the plate 10. Obviously, grooves might be provided to enhance the mating of the matching surfaces of the plate 10 and the body 20. As an alternative to the bolts 14 projecting through the holes 12 and 22, an adhesive might be used to provide a pressure seal between the plate 10 and the body 20.

A groove 28 coaxial with the body 20 on its inner surface provides a firm pressure-tight rest for a circlip 30 or like device which supports the circumferential lip of an elastic diaphragm 32. The diaphragm 32 or membrane may be constructed of any of a number of well-known materials exhibiting qualities of high strength, resiliency, and uniform elasticity. The diaphragm 32 supports a rigid cup 34. The cup 34 may be of a high strength plastic, a metal, or other known shock and wear resistant material. The cup 34 is joined to an inner lip of the diaphragm 32 by means providing a pressure seal such as bonding, an adhesive, or fabrication from the same piece of material, differently treated to impart the different rigidity characteristics. Alternatively, the diaphragm 32 may be joined to the cup 34 by a circlip or other fastener, not shown.

The cup 34 has an inner surface shaped to retain a conventional shaft bearing set 36 on the end of the shaft 26. The bearing set 36 may actually run against the inner surface of the cup 34 as an outer race, be firmly fixed in the cup 34 and run against an inner race adjacent the shaft 26, or may function in any other well-known manner. The bearing set 36 is shown held in place by an end clip 38 which may fit a groove (not shown) in the shaft 26 and by a circlip 40 fitted to a groove within the cup 34.

In practice, the volume 42 within the body 20 is evacuated to a pressure adapted to apply the appropriate preload to the bearing set 36. In one embodiment a vacuum achieved by ordinary vacuum pumps was selected. The evacuation may also be accomplished in a vacuum chamber or by other well-known means, such as by withdrawing air through a valve 44, the details of which are not shown. This evacuation creates a pressure differential on opposite surfaces of the diaphragm 32 which forces the diaphragm 32 in an upward sense (as seen in the drawing), forcing the cup 34 upward to press the circlip 40 against the bearing set 36 and cause uniform axial preloading thereof.

Various advantages of the arrangement shown in FIGURE 1 are manifest. For example, the utilization of gaseous pressure differentials to apply the preloading forces a uniformity to pressure application because of the inherent uniformity of gas pressures within a single volume. However, liquids may be used at different pressures, as well. Furthermore, the elastic diaphragm used to maintain the pressure differentials allows controlled shaft axial movement, damps external shocks, and accurately, yet resiliently, centers the shaft 26.

Figure 2:
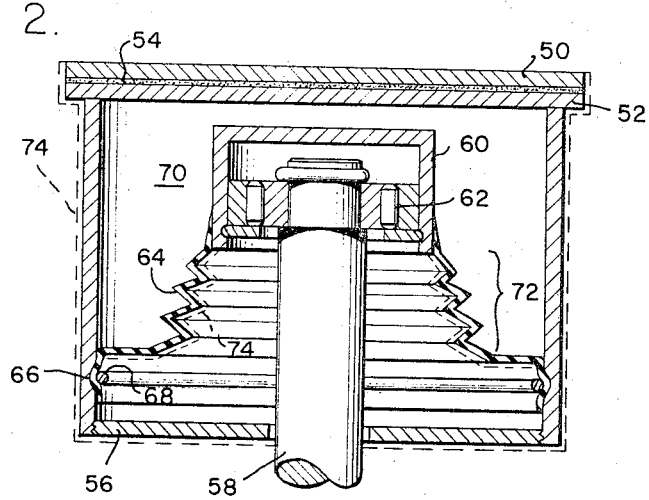
FIGURE 2 is a cross-sectional view of another preloading bearing assembly in accordance with the invention having a bellows-shaped elastic member.

In FIGURE 2, another embodiment of the invention is illustrated. In this alternative embodiment, a plate 50 affixed to a body 52 by an adhesive 54 to provide an airtight seal therebetween. The body 52 is a cylinder closed by the plate 50 at one end and by a circular plate 56 at the other. The plate 56 has a hole through which projects a shaft 58. Within the body 52 is supported a single ended cylinder 60 fabricated from a rigid material. The cylinder 60 supports a set of roller shaft end bearings 62. The cylinder 60 is maintained in position by an elastic membrane 64 affixed thereto and maintained in a groove 66 circling the interior of the body 52 by a circlip 68.

The elastic membrane 64 is affixed to the cylinder 60 in the manner above described to form a pressure seal. A volume 70 is exacuated to a pressure of one or two millimeters of mercury while the outside, or ambient pressure may remain at atmospheric pressure. This, the elastic membrane 64 forces the cylinder 60 upwardly (as viewed in the drawing) so that a preload is placed axially upon the bearing set 62. The elastic membrane 64 has a portion 72 shaped in a form of a bellows. The bellows shape of the portion 72 is such as to allow substantially great axial movement of the shaft 58 so that shafts of varying lengths or the lengths of which may vary relative to the body 52 may be accommodated. The bellows portion 72 also allows substantially more radial movement of the shaft 58 than does the diaphragm 32 since the bellows offers less radial restraint to shaft 58 of the embodiment shown in FIGURE 1.

Depending on the use to which the mechanism including the shaft and bearing assembly is used, such shaft radial movement may be desirable. Thus, by varying the shape of the elastic membrane, different degrees of centering are achieved with substantially the same assembly. In alternative embodiment a conical bellows assembly might be employed.

It might be noted at this point that, especially where substantial radial and axial movements are possible as in the embodiment described in FIGURE 2, it may be desirable to coat the surfaces of the elastic membrane with a soft, foam-like plastic material 74 (of any of a number of the types well known in the art) to protect the membrane from frictional and other deterioration. Furthermore, the entire body and associated components of the bearing assembly may be coated with a like resilient material 74 in order to render the transmission of externally applied shocks less likely.

Figure 3:
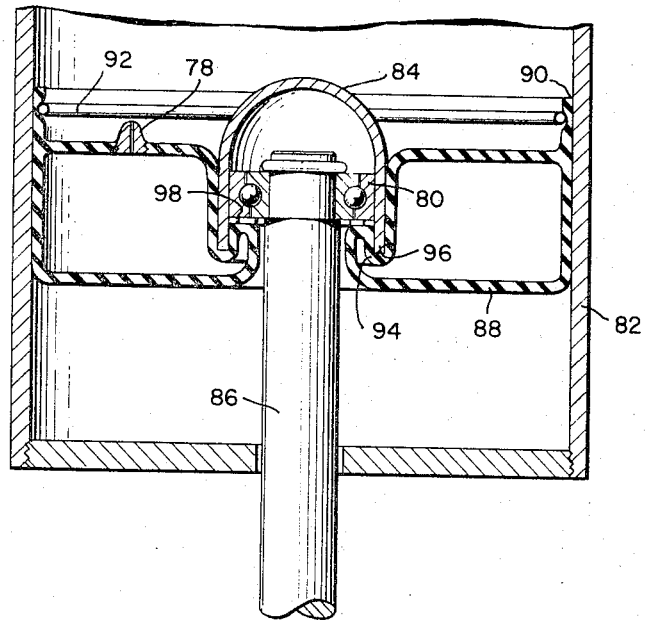
FIGURE 3 is another cross-sectional view of a preloaded bearing assembly in accordance with the invention utilizing a capsule elastic member.

In FIGURE 3, there is shown yet another alternative embodiment of the invention in which a pneumatic pressure capsule is utilized to create the uniform pressure for preloading the bearings of a bearing set 80. The assembly of FIGURE 3 comprises a body 82 of the type above discussed. The body 82 is arranged to support a cup 84 of a rigid material which supports the bearing set 80 at the end of a rotating shaft 86. The means by which the body 82 supports the cup 84 in the embodiment of FIGURE 3 includes a capsule 88 of an elastic material such as that used in the other embodiments for the diaphragm and bellows arrangements.

The capsule 88 shown is a pressure chamber by itself in the form of a doughnut, with certain modifications. It is supported at an extending circular lip 90 by a circlip or other locking device 92. The extensible elastic capsule 88 supports the cup 84 by pressure exerted radially thereon, inward in the direction of the shaft 86. This pressure is exerted by increasing pressure of the atmosphere within pressure-tight capsule 88. Thus, the cup 84 is resiliently retained with respect to radial movements. Obviously, a lip might be provided for fixing the capsule to the cup by a circlip 92.

The shape of the capsule 88 differs from that of a conventional toroid or doughnut essentially in that a portion 94 is shaped such as to overlap the lower or rim end 96 of the cup 84 and exert pressure thereon for preloading the bearing set 80. The greater pressure within the capsule 88 pushes upwardly, as seen in the drawing, upon the bearing set 80 to apply a uniform pressure thereon. It should be noted that though the portion 94 is shown pressing against the circlip which retains the bearing set 80 inside of the cup 84, the capsule 88 need not be so shaped but may press simply against the edge of the cup 84, at a position on the rim end 96, for example. Such pressure will, in a like manner, preload bearing set 80 and accomplish the appropriate uniform pressure.

The ease by which the embodiment shown in FIGURE 3 may be assembled should be noted. The cup 84 receives the bearing set 80 in the end of the shaft 86; and the circlip 98 is placed thereon, the shaft 86 having previously been extended through a hole in the body 82. The capsule element 88 is then placed within the body 82, and the cup 84 is forced thereinto with the capsule 88 in the deflated condition. The circlip 92 is placed in position to retain the capsule 88 within the body 82, and the capsule 88 is inflated.

The inflation may be accomplished by any of a number of well known means. For example a valve 78, the details of which are not shown, but which may have the characteristics of a standard football valve, may be utilized for inflating the capsule 88. The capsule 88 is inflated to the condition at which the appropriate uniform pressure is placed upon the bearing set 80 as measured by the axial force upon the shaft 86, extended. The entire assembly is then affixed to a base plate, by some means such as bolts or adhesive material. In this condition the shaft bearing set 80 is centered within the body 82 by a resiliently-yielding pressure exerted by portions 94 of the capsule 88. The cup 84 is also forced to place the appropriate uniform pressure on the bearing set 80 by pressure exerted on the lower portions of the cup 84.

A distinct advantage of the various embodiments shown above derives from the unique arrangement of the invention by which a continually uniform pressure is exerted upon the surfaces receiving the preload pressures. For example, in the embodiment shown in FIGURE 2, should the shaft position shift upwardly, the difference between the pressures within the volume 70 and external thereto will change very little, actually by the amount of pressure increase due to the volume displaced by the movement of the cylinder 60. Even with this slight change, however, the pressure exerted upon the exterior surface of the membrane 64 will be uniformly applied around the rim of the cylinder 60 and transmitted uniformly to the bearing set 62. As pointed out, this result is achieved because the pressures applied to accomplish the preloading are exerted by gaseous atmospheres which are necessarily uniform. This is to be contrasted with the exertion of pressures through spring loaded means which must act upon particular surfaces and, generally, at points and can therefore not be exerted uniformly. Furthermore, using gaseous pressure differentials to accomplish preloading allows a constant pressure to be maintained on the bearing set to accomplish the preloading so that no looseness can develop with wear between the preloading mechanism and the bearing set. This result is in contradistinction to the result which obtains where springs are used to apply the preloading pressure since springs cannot, inherently, apply substantially identical forces at different positions. Thus, play develops either with wear or with shaft end movement.

Figure 4:
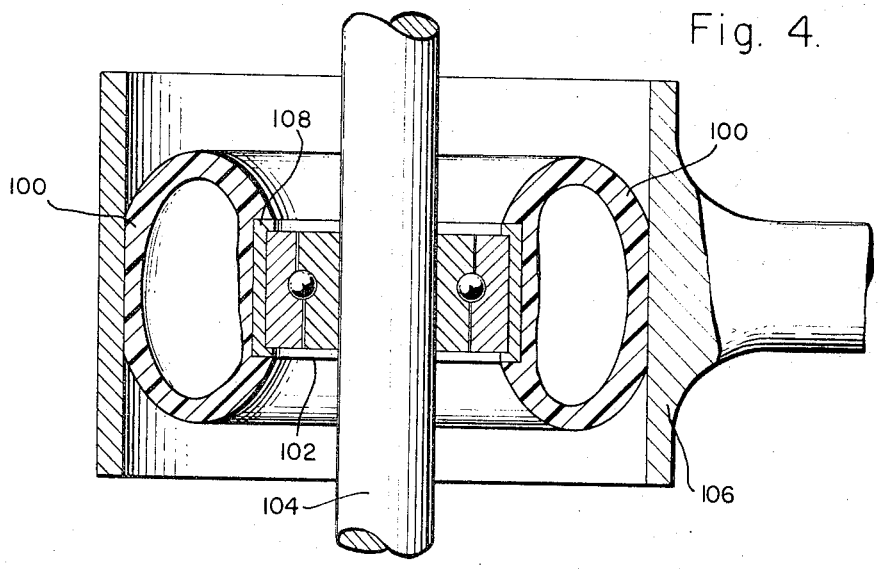
FIGURE 4 shows another form of pneumatic assembly which may be utilized for positioning the center of a shaft.

In FIGURE 4 there is shown an arrangement for radially preloading and centering a bearing in a manner analogous to that illustrated above. A uniform toroidal or doughnut shaped bladder 100 is arranged to encircle a shaft bearing set 102 which supports the shaft 104. A fixed supporting arrangement 106 comprising essentially a hollow cylinder of a rigid material performs a function analogous to that of the body 20 in the embodiment of FIGURE 1 illustrated above in retaining the bladder 100 in an appropriate central position. The bladder 100 is inflated and exerts pressure inwardly against the bearing set 102 to radially preload the bearings outwardly on the inner surface of arangement 106 to centralize the shaft 104. The pressure may actually be exerted upon the bearing set 102 by a cylindrical member 108 which collapses on the bearing race in a well-known manner and is maintained in position by the inflated bladder 100. Alternatively, a portion of the bladder 100 may be made rigid at the same position and arranged to collapse upon the bearing set 102 to accomplish the preloading. Such might be accomplished by sectioning the rigid portions of the member 108 and interleaving therewith elastic material capable of compression.

Alterations and modifications which do not depart from the spirit and scope of the invention will suggest themselves to those skilled in the art. For example, an arrangement like that illustrated in FIGURE 3 might well be used to place an axial preload on a shaft in order to make more precise the operation of and reduce the backlash of a bevel end gear attached to the shaft. Since other uses will obviously occur, it is my intention to be limited only by the scope of the appended claims:

What is claimed is:

1. An assembly for preloading shaft bearings comprising:
    a fixed body member;
    means for supporting a bearing set;
    an elastic member for positioning said bearing set supporting means relative to said body member; and
    means for placing different fluid pressures on opposite sides of said elastic member to preload the bearings of a supported bearing set.

2. An assembly as claimed in claim 1 further comprising a foam-like, resilient material coated on said elastic member.

3. An assembly as claimed in claim 1 further comprising a foam-like, resilient material coated to the exterior of said body member.

4. An arrangement for placing a load on a rotating shaft comprising, in combination:
    first means for providing a fixed foundation for the arrangement;
    a shaft supporting member;
    second means for resiliently positioning said shaft supporting member relative to said first means, said second means including means for forming a fluid-tight chamber; and
    means for creating fluid pressure differences between said chamber and the environment surrounding said chamber to cause said second means to exert uniform pressures on said shaft supporting member to preload bearings within the shaft supporting member.

5. A preloaded bearing assembly comprising, in combination:

a rotating shaft;
a bearing set supporting said shaft in rotation;
a fixedly-positioned casing surrounding said bearing set;
and means for affixing said bearing set to said casing including an elastically, deformable member;
and means for establishing fluid pressure differentials on opposite surfaces of said deformable member, whereby said deformable member is caused to force said bearing set axially along said shaft.

6. The combination comprising:
a rotatably mounted shaft;
shaft centering means supporting said shaft; and
means for restrictively positioning said shaft centering means including a fixed casing member, an elastic membrane having central and exterior portions, means for fixing the central portion of said membrane to said shaft centering means, means for fixing the exterior portion of said membrane so said casing member, and means for providing different fluid pressures on opposite surfaces of said membrane.

7. A shaft centering assembly comprising:
a cylindrical casing;
a shaft supporting member; and
a toroidal bladder of elastic material positioning said shaft supporting member centrally and being positioned within said casing, said bladder having a central portion extending inward of an end of said shaft supporting member for exerting uniform pressures on said shaft supporting member in a sense axially to a shaft supported thereby.

8. The combination comprising:
a rotating shaft, a set of bearings supporting one end of said shaft in rotation;
means for supporting said set of bearings;
a rigid container;
means for fixedly positioning said container;
an elastic membrane joining said container and said means for supporting said set of bearings to form a fluid-tight volume there-between; and
means for maintaining different fluid pressures on opposite sides of said membrane to exert a uniform axial pressure on said bearing set.

9. The combination claimed in claim 8 in which said membrane has the shape of a diaphragm.

10. The combination claimed in claim 8 in which said membrane has the shape of a bellows.

11. The combination claimed in claim 8 in which said membrane is a unitary, substantially toroidal bladder.

12. A bearing assembly comprising:
a mounting plate, a bell-shaped container adapted to mate with said mounting plate and having an opening at one end to admit a shaft;
means for providing a fluid tight seal between said plate and said container;
a cup-shaped bearing set retaining member; and
an elastic diaphragm forming a fluid-tight seal between said member and an interior surface of said container.

13. A bearing assembly comprising a mounting plate, a cylindrical container adapted to mate at one end to said plate to form a fluid-tight seal therewith;
a cylindrical bearing-set retaining member;
means for retaining a shaft bearing set within said member;
and an elastic, bellows-shaped membrane forming a fluid-tight seal between said member and an interior surface of said container.

References Cited
UNITED STATES PATENTS

| | | | |
|---|---|---|---|
| 2,155,919 | 4/1939 | Wooler et al. | 308—184 |
| 2,972,504 | 2/1961 | Baker | 308—207.1 |
| 3,203,186 | 8/1965 | Sheppard | 92—99 |
| 3,269,276 | 8/1966 | Natanson | 92—99 |

MARTIN P. SCHWADRON, *Primary Examiner.*

FRANK SUSKO, *Examiner.*